(12) United States Patent
Crawford

(10) Patent No.: US 9,031,867 B1
(45) Date of Patent: May 12, 2015

(54) COMPUTER IMPLEMENTED METHOD AND SYSTEM FOR ORDERING FOOD FROM A RESTAURANT

(71) Applicant: Joshua Earl Crawford, Odessa, TX (US)

(72) Inventor: Joshua Earl Crawford, Odessa, TX (US)

(*) Notice: Subject to any disclaimer, the term of this patent is extended or adjusted under 35 U.S.C. 154(b) by 256 days.

(21) Appl. No.: 13/654,634

(22) Filed: Oct. 18, 2012

(51) Int. Cl.
*G06Q 30/00* (2012.01)
*G06Q 30/06* (2012.01)

(52) U.S. Cl.
CPC .................. *G06Q 30/0601* (2013.01)

(58) Field of Classification Search
CPC ........................... G06Q 50/12; G06Q 30/0601
USPC .................................................. 705/15, 26.1
See application file for complete search history.

(56) References Cited

U.S. PATENT DOCUMENTS

| | | | |
|---|---|---|---|
| 7,689,450 B1* | 3/2010 | Dvorak et al. | 705/14.49 |
| 2004/0054592 A1* | 3/2004 | Hernblad | 705/15 |
| 2009/0204492 A1* | 8/2009 | Scifo et al. | 705/14 |
| 2011/0258058 A1* | 10/2011 | Carroll et al. | 705/15 |
| 2013/0191173 A1* | 7/2013 | Shobola | 705/15 |
| 2014/0136348 A1* | 5/2014 | Carroll et al. | 705/15 |

* cited by examiner

*Primary Examiner* — Hunter Wilder
(74) *Attorney, Agent, or Firm* — Buskop Law Group, PC; Wendy Buskop

(57) ABSTRACT

A computer implemented method and system for ordering food that creates a cloud-based central account. The method uses computer instructions to create and store a user account and restaurant accounts in the central account. A dynamic library of restaurant information is connected to the user account, the restaurant account and the central account. A menu ordering software application is accessed by a client device processor. Computer instructions create an order and a code indicating the order price and menu items, prompt the restaurant to create the menu items in the order, and tell the client device processor when the order is ready for pick up.

19 Claims, 5 Drawing Sheets

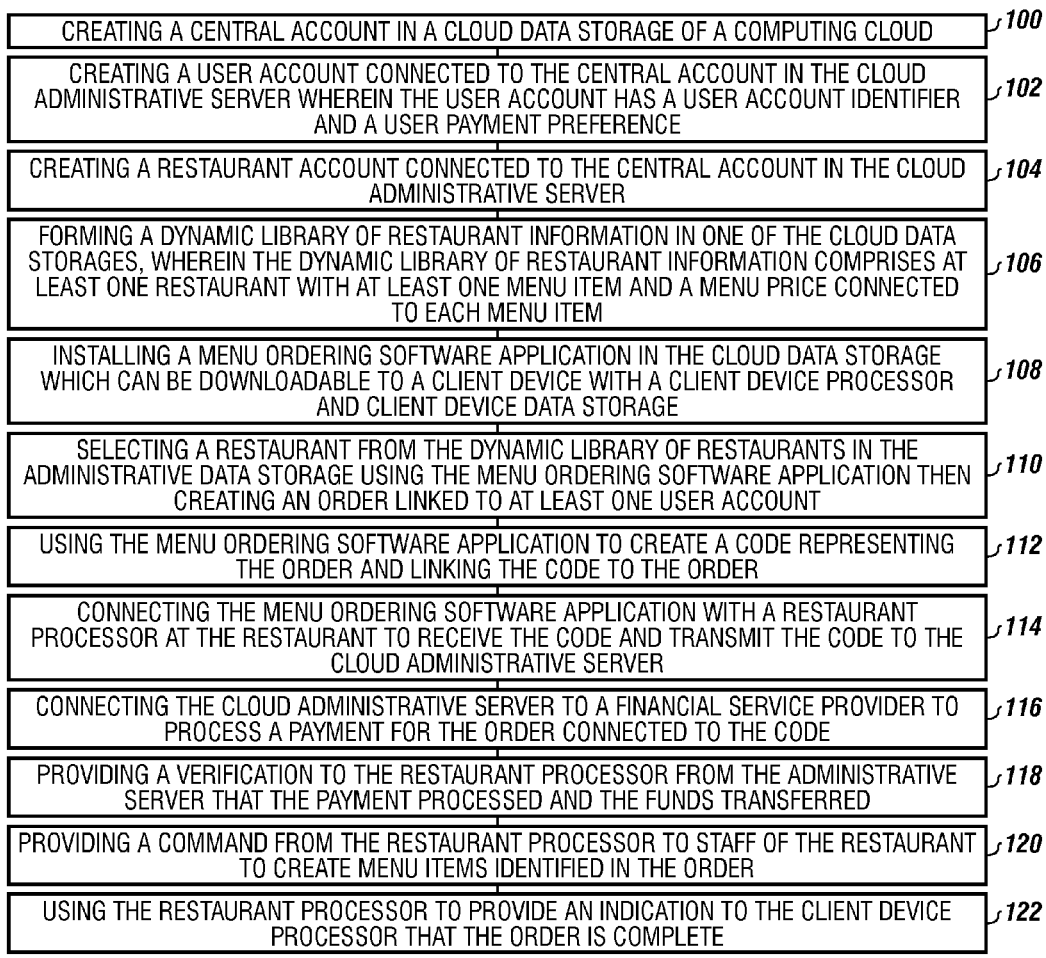

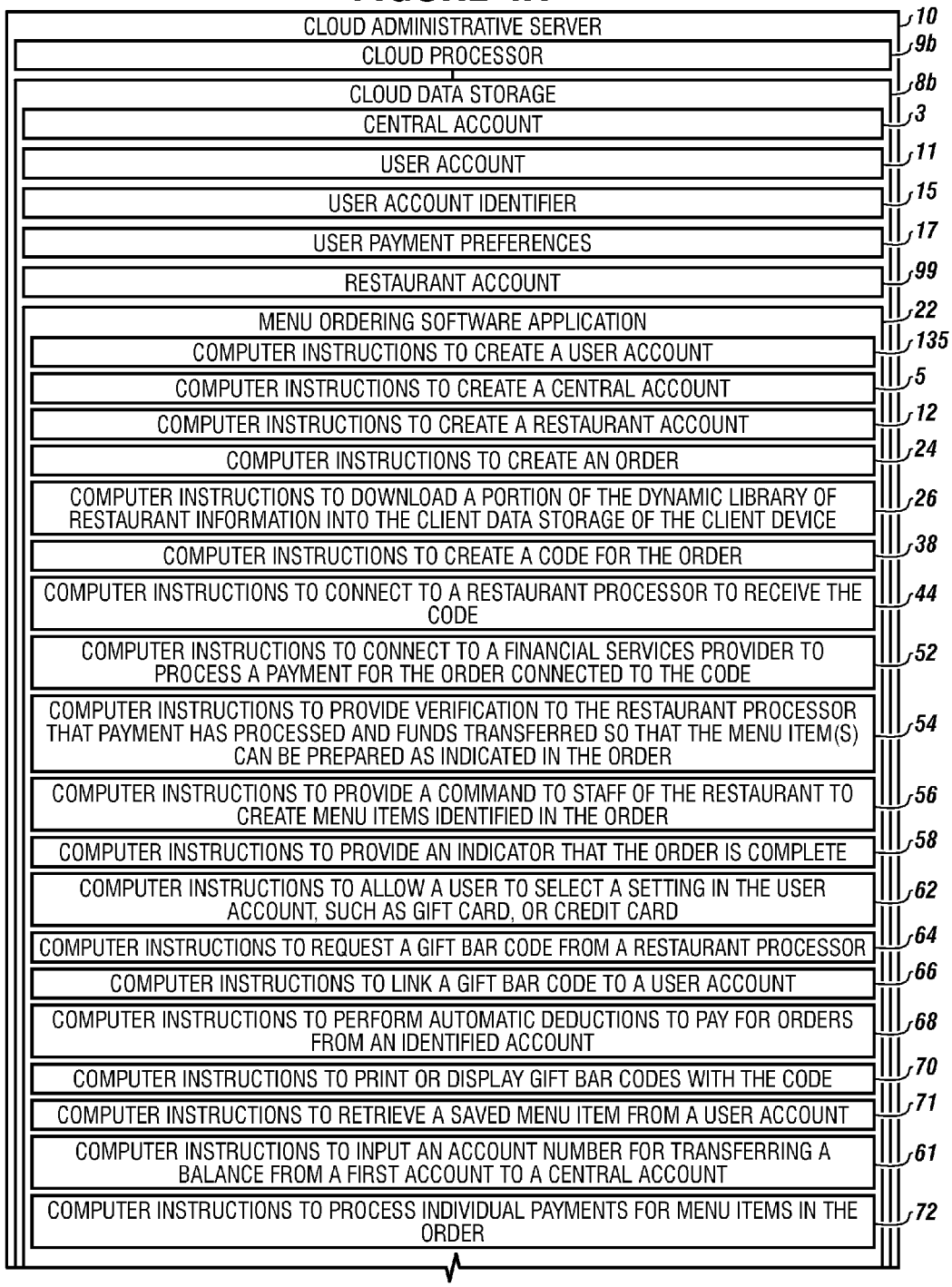

COMPUTER IMPLEMENTED METHOD AND SYSTEM FOR ORDERING FOOD FROM A RESTAURANT

FIELD

The present embodiments generally relate to a mobile application that enables consumers to place specific orders for a restaurant, including payment for those orders, without needing to stand in line or even speak to a receptionist.

BACKGROUND

A need exists for a mobile application that allows consumers to place more accurate orders within restaurants, including payment for those orders, without the need to stand in line, speak to a receptionist, or even speak the local language found in the area that the restaurant is located.

A need exists for a mobile application that allows consumers to transfer money from their selected financial account to another, such as a non-profit organization, a homeless person, or their own child away at college, allowing the consumer to find comfort in the knowledge that their financial transfer will only be used on food or other necessities offered through the application.

The present embodiments meet these needs.

BRIEF DESCRIPTION OF THE DRAWINGS

The detailed description will be better understood in conjunction with the accompanying drawings as follows:

FIG. 1 is a diagram of the steps of the method according to one or more embodiments.

FIGS. 4A-4B is a diagram of the cloud administrative server according to one or more embodiments.

Figure 2A:
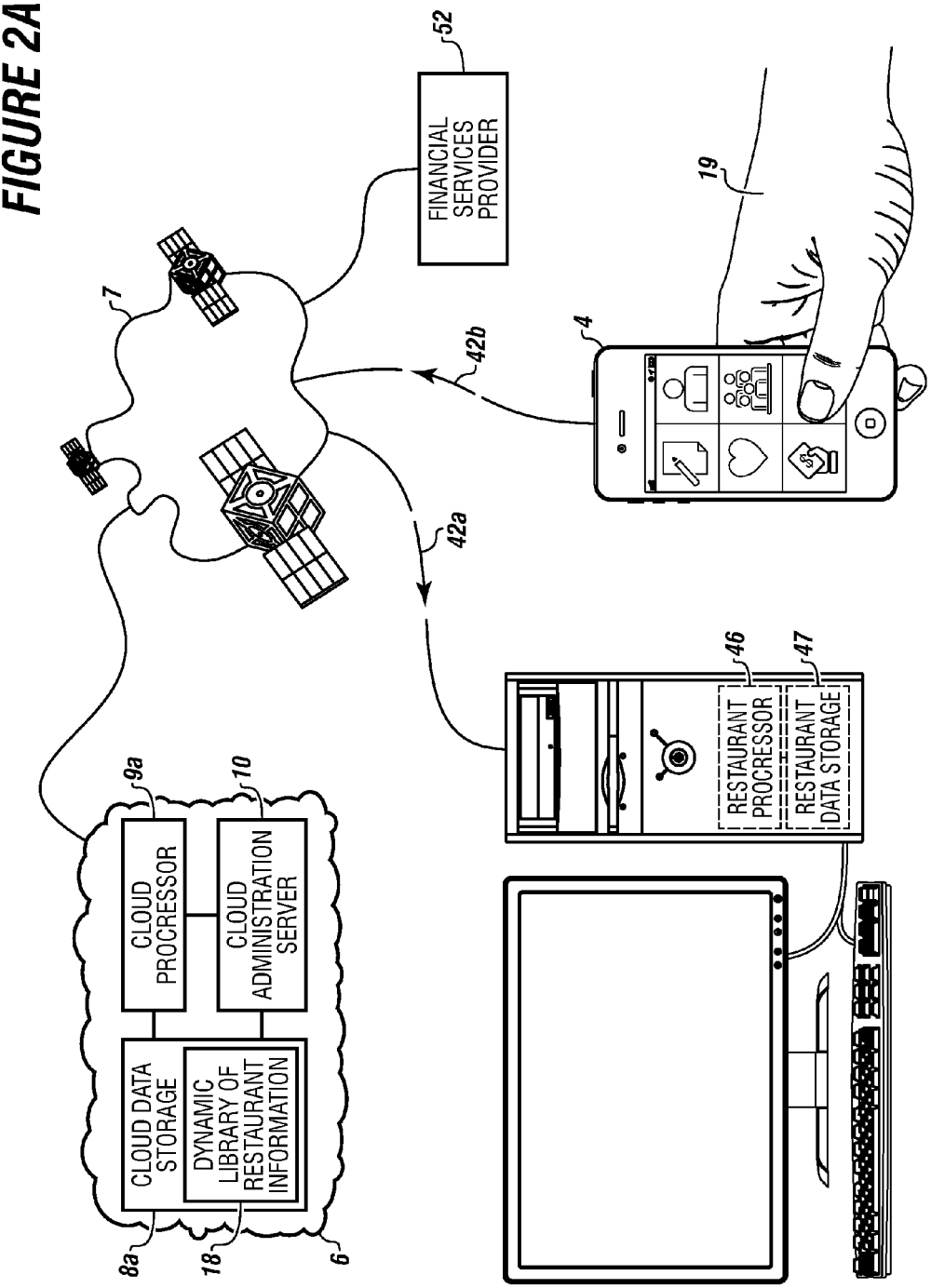
FIG. 2A is a diagram of a system of the method according to one or more embodiments.

The present embodiments are detailed below with reference to the listed Figures.

DETAILED DESCRIPTION OF THE EMBODIMENTS

Before explaining the present method and system in detail, it is to be understood that the method and system is not limited to the particular embodiments and that it can be practiced or carried out in various ways.

A benefit of the method and system is that it works for users in a foreign country that do not speak the language of the country, or further may have a speech impediment or other disability that would interfere with effective communication. For example, a tourist visiting the People's Republic of China, who is not a native speaker of the local language, would have the ability to place a complete and accurate order, including payment, without slowing down the progress of customers waiting in line to place their order. As another example, a cancer survivor who has lost the ability to speak would be able to order efficiently and accurately at a restaurant. Further, by eliminating the mistakes made in orders due to communication issues, the amount of food waste created by those mistakes is also eliminated.

A benefit of the method and system is that it allows for more efficient processing of orders, allowing lines in restaurants to move more quickly. For instance, in a restaurant such as Subway it is a common practice to stand in line and wait for the other customers to make decisions and place their order. The invention obviates this practice, allowing both the consumer and the restaurant to be more efficient with their time.

A benefit of the method and system is that it allows a user to comfortably donate money to non-profit organizations or individual people, without having to worry about the donation being used for an undesirable purpose. For example, a user can transfer a small sum, such as five dollars, to a person with the knowledge that their donation would be used on food related items.

A benefit of the method and system is that it allows users, such as parents; family members; and trusted associates, such as doctors or school officials; to control how the money can be allocated to certain items at restaurants to avoid allergies or to control spending limitations. For example, the parent of a college-enrolled student can transfer a set amount of money into the student's account with the comfort of knowledge that the student can only spend that money on food, without worrying about the "wasteful" purchases that many young adults are prone to making. As a further example, a doctor or parent/caregiver could limit the available food offerings to those that fit within a customizable diet, blocking the purchase of foods containing ingredients that the purchaser is allergic to or otherwise unable to eat.

A benefit of the method and system is that it allows groups of users to consolidate their orders into a single medium, eliminating the possible problems that can occur when a single person orders for a large group. For example, a user named Sally can take multiple orders from the members of the Women's Shelter that she works at, consolidating those orders into a simple list, reducing the possibility of ordering mistakes.

The term "central account," as used herein can refer to a financial account, such as a bank account, a credit union account, a brokerage account, or a similar financial service provider account controlled by an administrator of the computer implemented method for ordering food. This central account can include a plurality of individual accounts, each associated with a user account number. The central account can include computer instructions to monitor, manage, update, and track the operation of the entire computer implemented method for ordering food.

The term "computing cloud," as used herein can refer to one or more data storage units and one or more processing units, wherein the computing cloud is configured to provide at least one service and software resources.

The term "user account," as used herein can include a user account identifier, and a user payment preference. The user account can include the name of a user; login; password; address; email; phone number; social media identifier for connecting to a social media service provider; financial services information including but not limited to bank account name, gift card name and amount, debit card number and pin codes. Other third party financial service provider information can be included, such as GOOGLE WALLET™ accounts, PAYPAL™ accounts, and/or SQUARE™ accounts. A user account can be linked to other restaurant applications, such as YELP™ and FOURSQUARE™. A user account can include previously saved ordered menu items and prices. The user account can include age, gender, education, race, and similar demographic information. The user account can include "group information." The user account can include "order history."

The term "order history," as used herein can refer to all previously paid for items, enabling a user to obtain a copy of a receipt for any past order. The term "order history" can include the user account order even when the user account was not the primary account placing the order.

The term "group information," as used herein can refer to groups of friends that can be identified by the user account with a special code. For an example, group information can refer to "office staff" of the user account that is all employees of the user account. As another example, group information can refer to all members of JORDAN 7™ a charity that brings clean drinking water to people in need, particularly in Africa.

The term "restaurant account," as used herein can refer to an account created by an individual restaurant or a franchise owner, or groups of restaurants, like the LANDRY'S™ chain that can participate in this order placing methodology. The restaurant account can include the name of the restaurant, address of the restaurant or restaurants, reviews of the menu items, photos of the menu items, deals of the week promotions that might be pushed to user accounts, menu pricing, bank account or financial account information for receiving payment from the central account, and deviations in pricing from a standard price list.

The term "dynamic library of restaurant information," as used herein can refer to a dynamic updatable library for all restaurants that participate in this method and system. At least one restaurant, such as MCDONALDS™ at 123 West Main Street, or groups of like restaurants with the same name but different locations, or related restaurants with different names and different locations, each restaurant having at least one menu item and a menu price, can be included in this library. Photos of menu items, photos of locations, chefs, and patrons, can be included in this library. Proximity of a selected restaurant to major venues and attractions can be included in this library. The library of restaurant information also can include promotional information, such as, but not limited to, currently available deals, future deals, group promotions only available to groups of 10 or more, special wedding promotions, and similar event promotions, such as the Halloween night or Valentine's day promotions, can be included in this library. Additionally, the library of restaurant information can be accessed using a GPS coordinate. The library of restaurant information can include the language needed for communication with the restaurant, such as a restaurant with a menu that is only provided in Mandarin, with employees that only communicate in Mandarin.

The term "menu ordering software application," as used herein can refer to a phone application or client device application that can be downloaded or accessed from the computing cloud, and if downloaded, then stored on the client device in client device data storage. In embodiments, the menu ordering software application includes computer instructions to create an order, acquire a portion of the library of restaurant information, and computer instructions to create a code.

The term "order," as used herein can include a menu item identifier such as "corn dogs" or an identifier such as L2, which represents a tuna sandwich on whole wheat bread without mayonnaise. The "order," as the term is used herein can also include a menu item price, such as $2.99 US Dollars. In embodiments, an order can include a group order of menu items, with a menu item for a different user account or multiple user accounts. In embodiments, an order can include multiple items for a first user account and multiple items for a second user account. In embodiments, the order can include a tip to a server of a preset amount, such as from 5 percent to 20 percent. In an embodiment, the order can include any taxes or special handling fees.

The term "code," as used herein can refer to a code that represents certain information including, but not limited to, user account information, financial information, and the order. In embodiments, the code is a bar code, a QR code, a numeric code, an alpha numeric code, an audio bite, and combinations thereof.

The term "a portion of the library of restaurant information," as used herein can refer to a subset of the dynamic library of information which was selected by the user, using parameters that can include a specific language for the restaurant, such as Mandarin; geographical limitation, such as within 3 miles of the user's location; food type of the restaurant, such as Mexican; price range for menu items, such as between $5.00 and $8.00 US Dollars; user reviews; critic reviews; proximity to venues of interest, such as within 3 miles of a stadium; and combinations thereof.

The term "client device," as used herein can refer to a laptop; a cell phone; an IPAD™; a tablet; a personal computing device, with a processor connectable to the computing cloud; a desktop computer; an intelligent television; a car; another transport vehicle; and combinations of these. Client devices usable herein all have processors and data storage which can connect to the computing cloud.

The term "restaurant processor," as used herein can refers to a laptop; a cell phone; an IPAD™; a tablet; a personal computing device, with a processor connectable to the computing cloud, a desktop computer; and combinations of these. Restaurant processors usable herein all have processors and data storage which can connect to the computing cloud.

The term "financial services provider," as used herein can refer to a bank; a credit union; a brokerage house; a credit card company; GOOGLE WALLET™; various mobile payment phone application providers, such as SQUARE™; a debit card company; gift card companies; a loan shark, and, in certain embodiments, the credit balance carried by the user associated with the central account of the method described herein.

The term "financial information," as used herein can refer to the information linked to the user account, and it can include a third party account, such as a food stamp account code, a gift card number, a PAYPAL™ account number, a GOOGLE WALLET™ account number, a credit card number, a bank account number that permits auto drafting, or combinations thereof. The financial information can include computer instructions that allow the user to input an account number for transferring a balance from a first account to the central account.

The term "payment," as used herein can be the payment for the menu item; a group of menu items, including tax, tip, and other charges, such as a cover charge for entering an establishment, and charges and fees applied by the administrator of the central account as described herein. The fees can be 1 percent of the total bill. Payment can be made by credit card, debit card, borrowing, gift card, automatic bank transfer, or a third party financial institution, and combinations thereof.

The term "verification," as used herein can refer to a message sent to the restaurant processor that payment has been successfully transferred, and can display the total amount transferred, account information, account identifications, and similar information.

The term "data storage" as used herein can refer to data storage device; that records (stores) or retrieves (reads) information (data) from any medium, including the medium itself.

The method and system can relate to a computer implemented method for ordering food by creating a central account in a multiple cloud processors connected to cloud data storages devices.

The method can involve using computer instructions for creating and storing the central account in the cloud data storage devices.

The method can involve using computer instructions for creating and storing a user account connected to the central account in the cloud data storage device.

The method can involve using computer instructions for creating and storing a restaurant account connected to the central account in the cloud data storage.

The method can involve using a dynamic library of restaurant information in the cloud data storage connected to the user account, the restaurant account and the central account, wherein the dynamic library of restaurant information comprises at least one restaurant with at least one menu item and a menu price connected to each menu item.

The method can involve using a menu ordering software application accessible by using a client device processor, with the menu ordering software application containing a computer instruction to create an order, a portion of the dynamic library of restaurant information; and computer instructions to create a code.

The method can involve using the client device processor with client device data storage connected to the computing cloud via a network to create the user account connected to the central account. The user account can contain a user account identifier and a user payment preference.

The network can be a wireless network, a cellular network, a satellite network, a local area network, a wide area network a similar network, or combinations thereof.

The method can involve using the computer instructions to create an order for at least one user account.

The method can involve using the computer instructions in the menu ordering software application to create a code for the order.

The method can involve using the computer instructions in a restaurant processor at the restaurant to receive the code and transmit the code to the computing cloud.

The method can involve using the cloud processor and computer instructions in the cloud data storage to connect with a financial service provider and process a payment for the order.

The method can involve using the cloud processor and computer instructions in the cloud data storage to receive the payment from the financial services provider into the central account.

The method can involve using the cloud processor and computer instructions in the cloud data storage to verify to the restaurant processor that payment has successfully transferred from the financial service provider to the central account.

The method can involve using computer instructions in the restaurant processor to initiate creation of menu items identified in the order and using computer instructions in the restaurant processor to provide an indication to the client device processor that the order is complete and ready for pick up.

In embodiments, the initiation of the creation of menu items can occur when the restaurant processor transmits the order to the staff members that will create the food of the order by cooking, assembling, or similar production methods. The initiation of the creation of menu items can be through the printing out of an order for use by staff, the creation of an electronic "paid order" for use by staff, and combinations of these.

In an embodiment, a user, such as one named Duncan, can download the menu ordering software application to his client device processor from the computing cloud, after receiving an invite from his parents who have enticed him to join by sending him $100.00 in credits.

In an embodiment, the user, Duncan, can log into the menu ordering software application using his account from a social media provider, which can automatically load his demographic information and basic user information, such as his name and "friends" from that social media provider; creating his user account.

In an embodiment, Duncan is next asked to setup his financial information, choosing to integrate his user account with a financial service provider, balance gifts, or combinations thereof.

In an embodiment, the user, Duncan, can decide to go to a restaurant, identified as being located near his geographic position using a portion of the library of restaurant information. Duncan can then accept the menu ordering software application order system, indicating that restaurant's participation in the service. Upon opening the menu ordering software application, Duncan can then be notified of the restaurant's current promotions, and can elect to participate in the restaurant's current promotion for people who maintain a balance with the main administrative central account. In embodiments, Duncan can choose to ignore the current promotion and further proceed with his order, utilizing the restaurant's standard menu as downloaded to the menu ordering software application.

In an embodiment, the user, Duncan, can choose to select the promotion, and then proceed to select his preferred items, such as beef, chicken, or other applicable food source, and options, such as bread, cheese, vegetables, and/or other available items from the plurality of available menu items suitable to his liking. Each individual item selected can present a price.

In an embodiment, the user, Duncan, can choose to add an item, such as guacamole, to his sandwich, after which he will see the total price of his order increase.

In an embodiment, Duncan can receive a notification to his client device processor that the item will increase his price, as a specialty add-on option. Duncan, not wanting to pay for a premium menu option, can then remove the specialty add-on option, thereby reducing Duncan's order total to the original price.

In an embodiment, the user, Duncan, now satisfied with his total order can proceed by selecting the order process button or by tilting his client device processor upright, activating computer instructions for generating a readable code, for example a QR code.

In an embodiment, upon arriving at the restaurant and seeing the existing line of people, the user, Duncan, can scan the freshly generated QR code presented on the display connected to his client device processor using the restaurant processor, located at the entrance of the restaurant.

In one or more embodiments, the client device processor can display a notification of receipt by the restaurant upon the scanning of the code.

As the restaurant builds Duncan's order, Duncan can choose to save the order as a favorite in the cloud data storage linked to the user account, eliminating the need to rebuild the order in the future.

In an embodiment, the user can have the option to email the receipt to his parents with a thank you note, using computer instructions in the client device data storage.

In an embodiment, upon the restaurant's processing of the order, the user, Duncan, can receive an order complete notification that the order is complete on the display associated with his client device processor.

Duncan can then receive the completed order at the restaurant's designated pick-up area, avoiding the long line of customers.

In an embodiment, a restaurant owner, such as Orville, has chosen to implement the computer implemented method for ordering food, using the new restaurant processor, and has set up a restaurant account with the restaurant's financial information.

In this embodiment, Orville has a restaurant in an area where his customers speak Mandarin as their primary language, yet the majority of the restaurant's employees speak Spanish as their primary language. This method for ordering food allows Orville to produce and display menu items in Mandarin and receive notifications using computer instructions in the cloud data storage.

In an embodiment, the restaurant owner, Orville, can create a custom promotion, enticing customers to download and start using the menu ordering software application from the computing cloud.

In an embodiment, the restaurant owner, Orville, can set up his "restaurant account" to automatically print the orders in Spanish, avoiding any communication issues that can contribute to food waste due to order mistakes.

In an embodiment, the restaurant owner, Orville, can set up his "restaurant account" to, on demand, print the orders in Spanish, avoiding any communication issues that may contribute to food waste due to order mistakes.

Utilizing the order printout or electronic order display, Orville's employees can promptly build the order without communication issues.

Additionally, Orville's employees do not need to interact with any payment system, such as a cash register, further easing Orville's peace of mind by preventing theft by employees.

As a benefit, this method and system allows a restaurant owner to hire lesser qualified employees that may speak a different language that is not considered the primary language of the region. The restaurant owner then has the ability to lower his operating costs as he can allocate lower wages for his employees.

In an embodiment, the restaurant owner, Orville, can utilize reports on demographics, such as zip codes of his customers, using the menu ordering software application to view trends in different geographic areas; helping him create better promotions and find new restaurant locations.

In an embodiment, the service administrator can establish financial parameters custom tailored to the needs of restaurant franchises, allowing for individual locations of a franchise to deposit their payments into one centralized account. Further, the franchise can choose to set up a gift card system, allowing customers of the franchise to purchase and use gift cards in their orders.

In an embodiment, the service administrator can help a franchise establish new locations by importing portions of the library of restaurant information and standard price deviation; which is the percentage difference in menu item price that varies from restaurant to restaurant across the globe, taking into account currency values and local market prices.

In an embodiment, the service administrator can also customize portions of the library of restaurant information, such as the default language setting for each store, as some locations may be out of the United States in high touristy areas around the globe, such as setting the default language to French for a franchise's Paris locations.

In an embodiment, the service administrator can also, at the request of the restaurant, customize special promotions for those customers who maintain a balance instead of on the fly payments, in trade for more detailed reports from customer order history and demographic information.

In an embodiment, upon completion of the initial set-up with the restaurant, the service administrator can send out the restaurant processor to a few test locations. The new locations can be used as the administrator continues to launch the remaining locations in phases.

In an embodiment, the service administrator can integrate with new financial service providers, such as the GOOGLE WALLET™ payment system. The integration of such a service can allow the administrator the option to allow customers to earn reward points, should the administrator set up a rewards program, and as such services can provide a lower rate than another service, such as PAYPAL™.

In an embodiment, the service administrator can establish an incentive system, rewarding customers who maintain a minimum balance in their user accounts. For example, a user, Janice, maintains a minimum balance of $10.00 in her user account, allowing her access to special promotions, such as $2.00 off her order during the month of October, as opposed to the usual $1.00 off October promotion.

In another embodiment, the service administrator can establish a different incentive system, rewarding customers of restaurants that regularly run monthly promotions. For example, a restaurant, Nita's, runs multiple promotions a month, such as a $2.00 off any order promotion. The service administrator can configure an incentive system that matches those promotions, giving a customer of Nita's $4.00 off any order.

In an embodiment, the service administrator can choose to implement multiple combinations of options as provided in earlier embodiments, integrating the options as desired into "point of sale" (POS) systems, allowing for a better notification system for the user as well as the restaurant.

In an embodiment, the service administrator, through the integration of the various options as presented in earlier embodiments, can receive an order from the customer menu ordering software application to the central account through the computing cloud, processing and verifying the payment. The administrator is then able to pass the order to the restaurant POS through the computing cloud, allowing seamless integration of the orders in normal reporting procedures.

In an embodiment, a restaurant, such as one owned by Mae, can have a restaurant processor set up at the entrance to her store, configured to scan her choice of codes for the ordering process. For example, Mae can choose to use QR codes instead of standard bar codes because QR codes are able to store more data within the code.

In another embodiment, Mae, already offering free WIFI™ internet access in her restaurant, can configure her WIFI™ service to accept orders placed by customers using the menu ordering software application.

For example, Mae, already offering general internet access through a port, can configure her wireless router to communicate with her restaurant processor and the customers' menu ordering software application through another port. This way, the restaurant processor can be configured to easily differentiate between the computing requests for general internet usage and orders placed through the menu ordering software application. The orders can then be processed through the restaurant's existing order queue as usual.

In an embodiment, Mae's restaurant can be operated from a proprietary point of sale system that cannot be modified. However, in an embodiment, Mae's restaurant does have a system in place to accept gift cards as a form of payment. Mae's restaurant can thereby be configured to utilize this gift card system as a way to incorporate the restaurant processor.

For example, Mae, not having the funds to completely incorporate the ordering system, can set a system up to utilize her already installed gift card system. That way, a customer can place an order through the menu ordering software application as usual.

However, instead of the payment method being directly applied to the order, the payment method can instead access a gift card number. The gift card number can allow the customer's user account to automatically receive funds.

The funds transferred from the customer's default method of payment to the gift card can then be used to complete the payment on the customer's order by deducting the order total from the gift card balance as the payment is processed.

In another embodiment, Mae can configure her restaurant to partake in a rewards based system set up through the menu ordering software application. For example, a user, Jack, can receive a $5.00 coupon to any restaurant participating in the system after he placed 25 orders using the menu ordering software application.

In another embodiment, Mae can configure her restaurant to partake in a loyalty-based reward system, rewarding frequent customers of her restaurant. For example, Mae can configure her system to reward a free brownie to people who place an order at her restaurant more than three times a week, for two consecutive weeks. Upon completing this prerequisite, a customer of Mae's restaurant can receive a notification of the promotion after each reward qualification.

In another embodiment, Mae, curious as to the effectiveness of the system, can configure her restaurant account in the system to schedule a report to be run at the end of every month. Mae can then further have that report be automatically emailed to her business email account, allowing her to evaluate the report and adjust the promotions accordingly.

In an embodiment, Mae can configure her restaurant to use multiple languages in the order preparation process.

For example, Mae can configure her restaurant to, after a customer scans a code, print the customer orders in French for the service staff, while alternatively displaying the order on the digital display in the kitchen area in another language, such as Croatian, for the cooks.

Mae can also configure her weekly specials within the library of restaurant information. For example, Mae can run a turkey sandwich special in the month of November, and can then change her special to a Hot Dog special during the month of July.

In an embodiment, a user, such as Ty, can log into the menu ordering software application with his FACEBOOK™ user account. For Example, Ty, utilizing this social media integration, then has the option to invite his "friends," as linked to his FACEBOOK™ account, to use the menu ordering software application.

In an embodiment, Ty can link his user account with his financial information. When ordering, the QR code generated with Ty's order can include the payment method as well as the order information, allowing for an easy transaction.

For example, Ty can set up his user account to use his VISA™ credit card as the default method of payment.

In an embodiment, upon completion of the preparation stage of the order, a restaurant's point of sale system can process the order numbers onto a display at the designated food pickup area. For example; a first customer Joe, who received order number 105; and a second customer Judy, who received order number 106; can each pick up their order at the designated food pickup order when their order number is presented on the system display.

In another embodiment, Ty can connect to a restaurant's existing WIFI™ access to place his order using the menu ordering software application on his client device.

For example, Ty can have a cellular device that is configured to automatically connect to open, available, wireless networks whenever they are detected upon arriving at a restaurant that Ty found through his menu ordering software application.

In an embodiment, Ty can save his favorite orders in the menu ordering software application, saving him time the next time he visits the restaurant.

In an embodiment, Ty can choose which food to order based on the menu item and menu item price as displayed in the menu ordering software application. For example, Ty can choose to order a Tuna Sandwich at a price of $3.99, as displayed in the menu ordering software application.

In an embodiment, Ty can work in an office where he has to pick up lunch for multiple employees of his company. Upon Ty's request, the members of his office can send Ty their orders, as well as their method of payment.

For Example, Ruth, Patrick, Wendy, Jason, and Jeffrey all have different orders to give to Ty, with Ty ordering and picking them up. Ruth, Patrick, Wendy, Jason, and Jeffrey all send their orders and payment method to Ty, through the menu ordering software application, allowing for precise completion of each order within a group order, eliminating the possibility of mistakes common in group ordering scenarios, as well as the need to exchange physical money between co-workers.

In another embodiment, Ty has decided to treat his office to lunch. Upon receipt of all of the orders, when Ty attempts to place the order he learns of a deficit of funds in his account. Ty can then be notified that the order total was higher than the funds available in his default method of payment, and the menu ordering software application can then prompt him with the option to utilize funds from his system balance, or other payment method, instead.

In an embodiment, Jonilynn would like to donate food vouchers with limited options and dollar amounts to homeless persons in need. Jonilynn can print paper vouchers with preprinted codes that had her account information stored within, allowing for a single meal to be purchased at local participating restaurants, per voucher.

In an embodiment, a user, Michelle, can have difficulties ordering at a drive-thru window, due to a health condition that has deteriorated her vocal cords. Using the menu ordering software application, Michelle can create her order and scan the code at the scanner located in the drive-thru line, eliminating ordering mistakes that were common when she would attempt to yell her order, due to her condition.

Turning now to the Figures, FIG. 1 is a diagram of the steps of the method according to one or more embodiments.

The method can include creating a central account in a cloud data storage of a computing cloud, as Step 100.

The method can include creating a user account connected to the central account in the cloud administrative server, wherein the user account has a user account identifier and a user payment preference, as Step 102.

The method can include creating a restaurant account connected to the central account in the cloud administrative server, as Step 104.

The method can include forming a dynamic library of restaurant information in one of the cloud data storages, wherein the dynamic library of restaurant information comprises at least one restaurant with at least one menu item and a menu price connected to each menu item, as Step 106.

The method can include installing a menu ordering software application in the cloud data storage, which can be downloadable, to a client device with a client device processor and client device data storage, as Step 108.

The method can include selecting a restaurant from the dynamic library of restaurants in the administrative data storage using the menu ordering software application then creating an order linked to at least one user account, as Step 110.

The method can include using the menu ordering software application to create a code representing the order and linking the code to the order, as Step 112.

The method can include connecting the menu ordering software application with a restaurant processor at the restaurant to receive the code and transmit the code to the cloud administrative server, as Step 114.

The method can include connecting the cloud administrative server to a financial service provider to process a payment for the order connected to the code, as Step 116.

The method can include providing a verification to the restaurant processor from the administrative server that the payment processed and the funds transferred, as Step 118.

The method can include providing a command from the restaurant processor to staff of the restaurant to create menu items identified in the order, as Step 120.

The method can include using the restaurant processor to provide an indication to the client device processor that the order is complete, as Step 122.

FIG. 2 shows a diagram of a system usable with the method according to one or more embodiments.

A computing cloud 6 containing a cloud processor 9a connected to a cloud administrative server 10 is shown. Additional cloud processors can be used with the present system.

A cloud data storage 8a can connect with the cloud processor 9a. A dynamic library of restaurant information 18 can be in one of the cloud data storages, shown here as cloud data storage 8a.

The computing cloud 6 can communicate over a first network 7 with a user 19. The user can have a client device 4.

The network can be any network, such as a cellular network, a satellite network, a local area network, a wide area network, a similar network, or combinations thereof.

The client device can be a laptop; a cell phone; a tablet; a personal computing device, with a processor connectable to the computing cloud; a desktop computer; an intelligent television; a car; another transport vehicle; and combinations of these.

In one or more embodiments, a financial services provider 52 can communication with the first network 7 for processing payment.

The user 19 can transmit a code 42b to a restaurant processor 46 via the first network 7. The restaurant provider 46 can receive codes 42a from the client device 4 via the first network 7. The codes can be transmitted and received via the computing cloud 6 using a restaurant processor 46 connected to the restaurant data storage 47, or via an additional network.

Figure 2B:
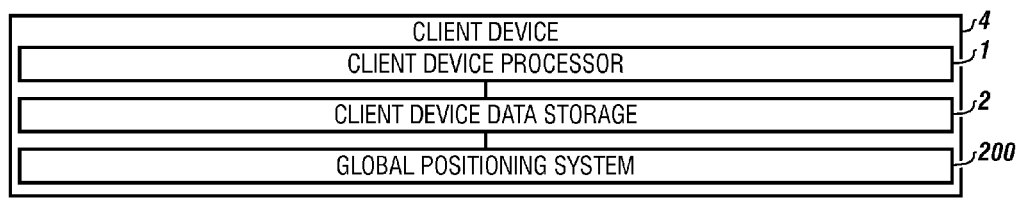
FIG. 2B depicts the client device according to one or more embodiments.
Figure 2C:
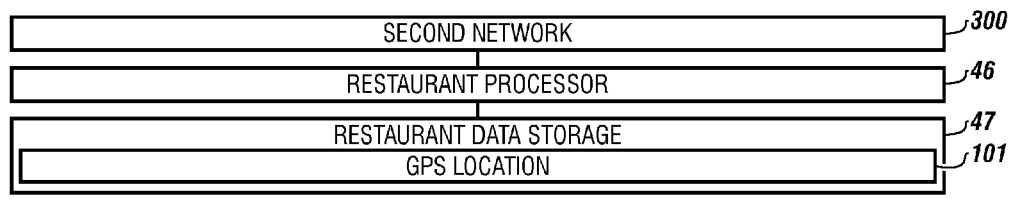
FIG. 2C depicts the restaurant processor according to one or more embodiments.

In an embodiment, the client device can include a global positioning system 200 in the client device, which can use a GPS location 101, shown in FIG. 2C, of the restaurant data storage to enable the restaurant processor to identify client device locations that are within the footprint of the restaurant.

FIG. 2B depicts the client device according to one or more embodiments.

The client device 4 can have a client device processor 1 connected to client device data storage 2, that can download the menu ordering software application into the client device data storage and then use the dynamic library of restaurants using the menu ordering software application.

The user can have a client device 4 with a client device processor 1 connected to a client device data storage 2, that can connect to the first network 7, and wherein the client device 4 can communicate to the restaurant processor 46 via the first network 7. In one or more embodiments, the client device can communication to the restaurant processor though an additional network.

FIG. 2C depicts the restaurant processor according to one or more embodiments.

The restaurant processor 46 can be connected to restaurant data storage 47. The restaurant processor 46 can include and can communicate with a GPS location 101, which can be in the restaurant data storage 47, allowing the restaurant processor 46 to identify users with client device that are within the footprint of the restaurant, to identify the user for order pickup.

A second network 300 can be located in or in communication with the restaurant processor 46. For example, if free internet access is available in a restaurant, the internet service, WIFI™ service, BLUETOOTH™ service, or second network can accept orders placed by customers using the menu ordering software application.

The second network 300 can be a wireless network, such as a cellular network, a satellite network, a local area network, a wide area network, a similar network, or combinations thereof. The restaurant processor can communicate not only with the client devices but other devices via this second network.

This second network can be password encrypted. This second network can be geographically limited, such as to the footprint of the restaurant.

Figure 3:
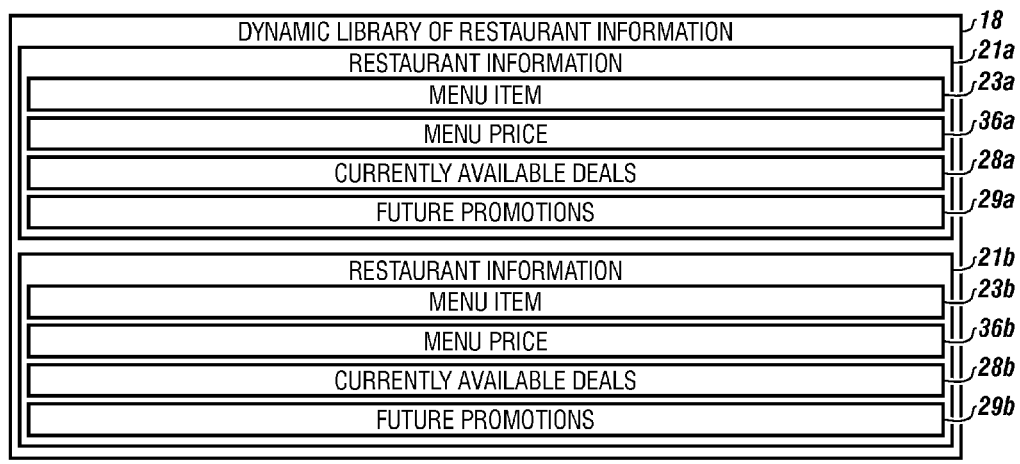
FIG. 3 is a diagram of a portion of the dynamic library of restaurant information according to one or more embodiments.

FIG. 3 shows a diagram of the dynamic library of restaurant information.

The dynamic library of restaurant information 18 can contain a plurality of restaurant information, such as restaurant information 21a and 21b. The restaurant information 21a and 21b can have a menu item 23a and 23b, a menu price 36a and 36b.

The restaurant information 21a and 21b as an option can have currently available deals 28a and 28b and future promotions 29a and 29b. The restaurant information can be in any language, such as the restaurant's native language, such as Chinese.

Figure 4B:
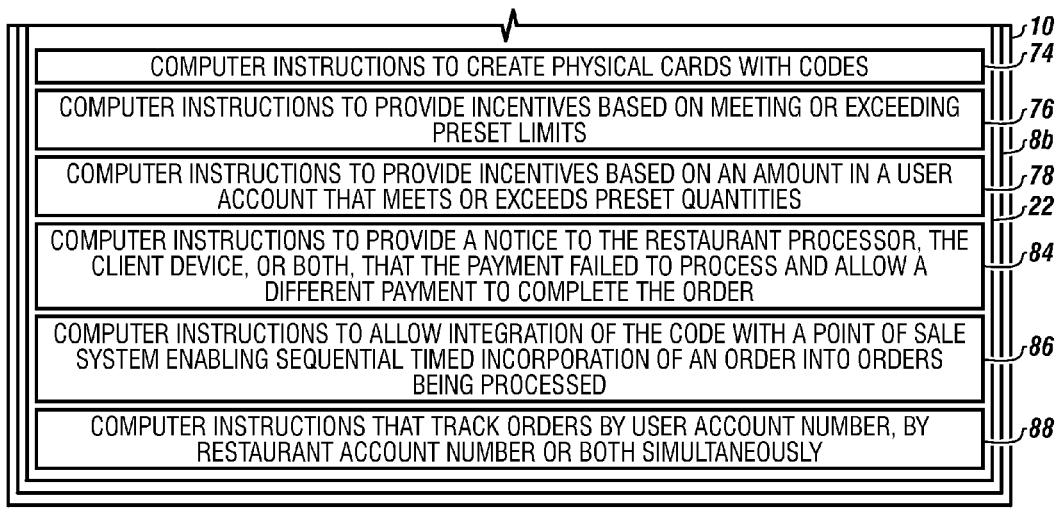

FIGS. 4A-4B shows the cloud administrative server as a diagram and the various computer instructions contained in the cloud data storage of the cloud administrative server.

The cloud data storage 9b of the cloud administrative server 10 can have the menu ordering software application 22.

The software termed herein "menu ordering software application" can be contained within the cloud data storage 8b. Additionally cloud data storage 8b can contain user account identifier 15, a central account 3, a restaurant account 99, user payment preferences 17 and the user account 11.

The menu ordering software application 22 can include computer instructions to create a user account 135, computer instructions to create a restaurant account 12, computer instructions to create a central account 5, computer instructions to create an order 24, which can use the dynamic library of restaurant information.

The menu ordering software application 22 can include computer instructions to download a portion of the dynamic library of restaurant information into the client data storage of the client device 26.

The menu ordering software application 22 can include computer instructions to create a code for the order 38.

The menu ordering software application 22 can include computer instructions to connect to a restaurant processor to receive the code 44.

The menu ordering software application 22 can include computer instructions to connect to a financial services provider to process a payment for the order connected to the code 52.

The menu ordering software application 22 can include computer instructions to provide verification to the restaurant processor that payment has processed and funds transferred so that the menu item(s) can be prepared as indicated in the order 54.

The menu ordering software application 22 can include computer instructions to provide a command to staff of the restaurant to create menu items identified in the order 56.

The menu ordering software application 22 can include computer instructions to provide an indicator that the order is complete 58.

The menu ordering software application 22 can include computer instructions to allow a user to select a setting in the user account, such as gift card, or credit card 62.

The menu ordering software application 22 can include computer instructions to request a gift bar code from a restaurant processor 64.

The menu ordering software application 22 can include computer instructions to link a gift bar code to a user account 66.

The menu ordering software application 22 can include computer instructions to perform automatic deductions to pay for orders from an identified account 68.

The menu ordering software application 22 can include computer instructions to print or display gift bar codes with the code 70.

The menu ordering software application 22 can include computer instructions to retrieve a saved menu item from a user account 71.

The menu ordering software application 22 can include computer instructions to input an account number for transferring a balance from a first account to a central account 61.

The menu ordering software application 22 can include computer instructions to process individual payments for menu items in the order 72.

The menu ordering software application 22 can include computer instructions to create physical cards with codes 74.

The menu ordering software application 22 can include computer instructions to provide incentives based on meeting or exceeding preset limits 76.

The menu ordering software application 22 can include computer instructions to provide incentives based on an amount in a user account that meets or exceeds preset quantities 78.

The menu ordering software application 22 can include computer instructions to provide a notice to the restaurant processor, the client device, or both, that the payment failed to process and allow a different payment to complete the order 84.

The menu ordering software application 22 can include computer instructions to allow integration of the code with a point of sale system enabling sequential timed incorporation of an order into orders being processed 86.

The menu ordering software application 22 can include computer instructions that track orders by user account number, by restaurant account number or both simultaneously 88.

In one or more embodiments, the method and system can be used by pharmacists to fill medicine orders, and for other types of business that require uniquely assembled items that spoil on a timed system.

While these embodiments have been described with emphasis on the embodiments, it should be understood that within the scope of the appended claims, the embodiments might be practiced other than as specifically described herein.

What is claimed is:

1. A computer implemented method for ordering food between at least one client device connected to a computing cloud using a first network, the computer implemented method comprising:
    a. creating a central account in a cloud data storage of the computing cloud connected to the first network;
    b. creating a user account connected to the central account in a cloud administrative server, wherein the user account has a user account identifier and a user payment preference;
    c. creating a restaurant account connected to the central account in the cloud administrative server;
    d. forming a dynamic library of restaurant information in the cloud data storage, wherein the dynamic library of restaurant information comprises at least one restaurant with at least one menu item and a menu price connected to each menu item;
    e. installing a menu ordering software application in the cloud data storage which can be downloadable to a client device with a client device processor and client device data storage, wherein the menu ordering software application comprises:
        (i) computer instruction to create an order in the client device;
        (ii) computer instructions to download a portion of the dynamic library of restaurant information in the client device; and
        (iii) computer instructions to create a code using the client device linked to the order;
    f. using the menu ordering software application to select a restaurant from the dynamic library of restaurants, then create the order linked to the user account;
    g. using the menu ordering software application to create the code representing the order and linking the code to the order;
    h. connecting the menu ordering software application with a restaurant processor at the restaurant to receive the code and transmit the code to the cloud administrative server;
    i. connecting from the cloud administrative server to a financial services provider to process a payment for the order connected to the code;
    j. providing a verification to the restaurant processor from the cloud administrative server that the payment processed and funds transferred;
    k. providing, in response to the verification, a command from the restaurant processor to staff of the restaurant to create menu items identified in the order; and
    l. providing tracking of the order and using the restaurant processor to provide an indication to the client device processor that the order is complete.

2. The computer implemented method of claim 1, wherein the command is a member of the group comprising:
    a. a printed order for use by staff;
    b. an electronic "paid order" for use by staff; and
    c. combinations thereof.

3. The computer implemented method of claim 1, wherein the code is selected from the group: a bar code, a QR code, a numeric code, an alpha numeric code, an audio bite, and combinations thereof.

4. The computer implemented method of claim 1, wherein the code comprises the user account with user financial information, the order including a total price, and a restaurant account.

5. The computer implemented method of claim 1, wherein the user account comprises at least one saved menu item and the cloud administrative server comprises computer instructions to retrieve at least one saved menu item from the user account to create the order.

6. The computer implemented method of claim 1, wherein the order comprises: a menu item and a menu price.

7. The computer implemented method of claim 1, wherein the dynamic library of restaurant information comprises:
  a. currently available deals;
  b. future promotions; and
  c. language for communicating with the restaurant.

8. The computer implemented method of claim 1, wherein the cloud administrative server further comprises: computer instructions allowing the user to input an account number for transferring a balance from a first account to the central account, and wherein the first account can be a member of the group consisting of:
  (i) a third party card number;
  (ii) a gift card number;
  (iii) a PAYPAL™ account number;
  (iv) a GOOGLE WALLET™ account number;
  (v) a SQUARE™ account number;
  (vi) a credit card number;
  (vii) a bank account number;
  (viii) borrowing; and
  (ix) combinations thereof.

9. The computer implemented method of claim 1 wherein the menu ordering software application comprises:
  a. computer instructions that allows the user to select a setting in the user account wherein the setting can:
    (i) designate automatic deductions from balances in the user account for paying orders; or
    (ii) designate automatic deductions from a gift card number linked to the user account for paying orders;
  b. computer instructions to request a gift card bar code from the restaurant processor;
  c. computer instructions to link the gift card bar code in the user account;
  d. computer instructions to perform an automatic deduction and transfer funds from the user account or linked gift card to the restaurant processor and the gift card bar code; and
  e. computer instructions to print or display or both, the gift card bar code with the code associated with the order as payment for the order, or combinations thereof.

10. The computer implemented method of claim 1, wherein groups of people can make a single order and use computer instructions for processing individual payments for menu items in the order.

11. The computer implemented method of claim 1, further comprising using computer instructions to create one or more physical cards, paper vouchers, or combinations thereof, with codes that designate (i) menu item identifiers and (ii) provide payment or user account information simultaneously.

12. The computer implemented method of claim 1, wherein the order can be created or modified using a scanner located proximate to a drive-thru or a kiosk.

13. The computer implemented method of claim 1, further comprising computer instructions which provide incentives based on preset limits for user spending, frequency at an establishment, frequency in placing orders at a restaurant, or frequency in placing orders.

14. The computer implemented method of claim 1, further comprising computer instructions which provide incentives based on the amount of funds maintained in a user account which meet or exceed preset quantities.

15. The computer implemented method of claim 1, further comprising:
  a. providing a notice that payment would not process from the computing cloud to (i) the user account and (ii) the restaurant processor; and
  b. allowing the user to select a different payment method to complete the order.

16. The computer implemented method of claim 1, further comprising allowing immediate integration of the code within a point of sale ordering system of the restaurant enabling immediate sequential timed incorporation of the order into orders currently being processed by the restaurant.

17. The computer implemented method of claim 1, wherein the restaurant processor further connects to a second network which communicates to the first network, and wherein the client device can communicate to the restaurant processor via the second network.

18. The computer implemented method of claim 17, wherein the second network is a wireless network.

19. The computer implemented method of claim 18, wherein a global positioning system in the client device uses a GPS location of the restaurant data storage to enable the restaurant processor to identify client device locations that are within the footprint of the restaurant.

* * * * *